(No Model.) 4 Sheets—Sheet 1.
F. P. ROSBACK.
PERFORATING MACHINE.
No. 387,543. Patented Aug. 7, 1888.
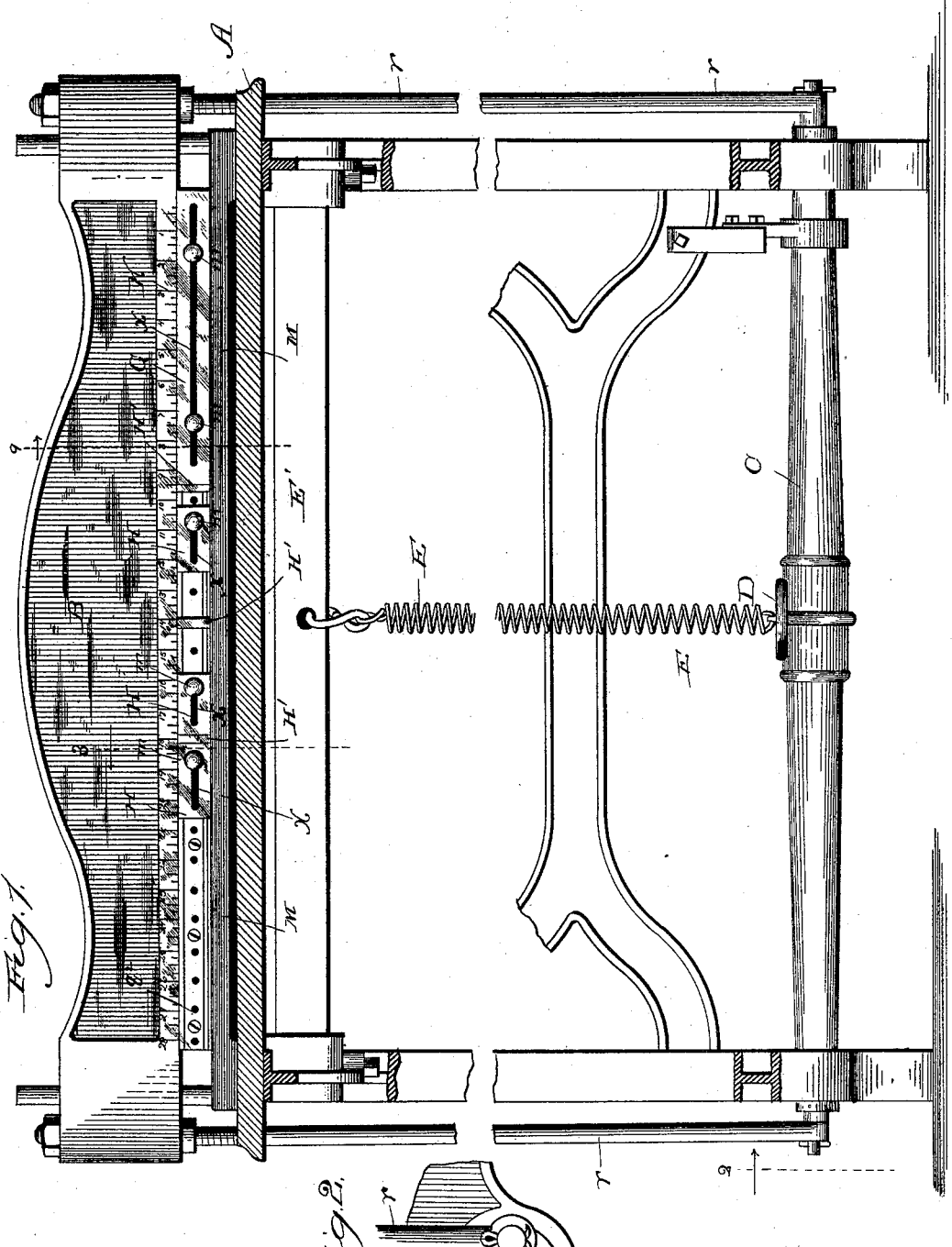
Witnesses:
Chas. E. Gaylord.
J. H. Dyrenforth.
Inventor:
Frederick P. Rosback.
By Dyrenforth & Dyrenforth
Attys.

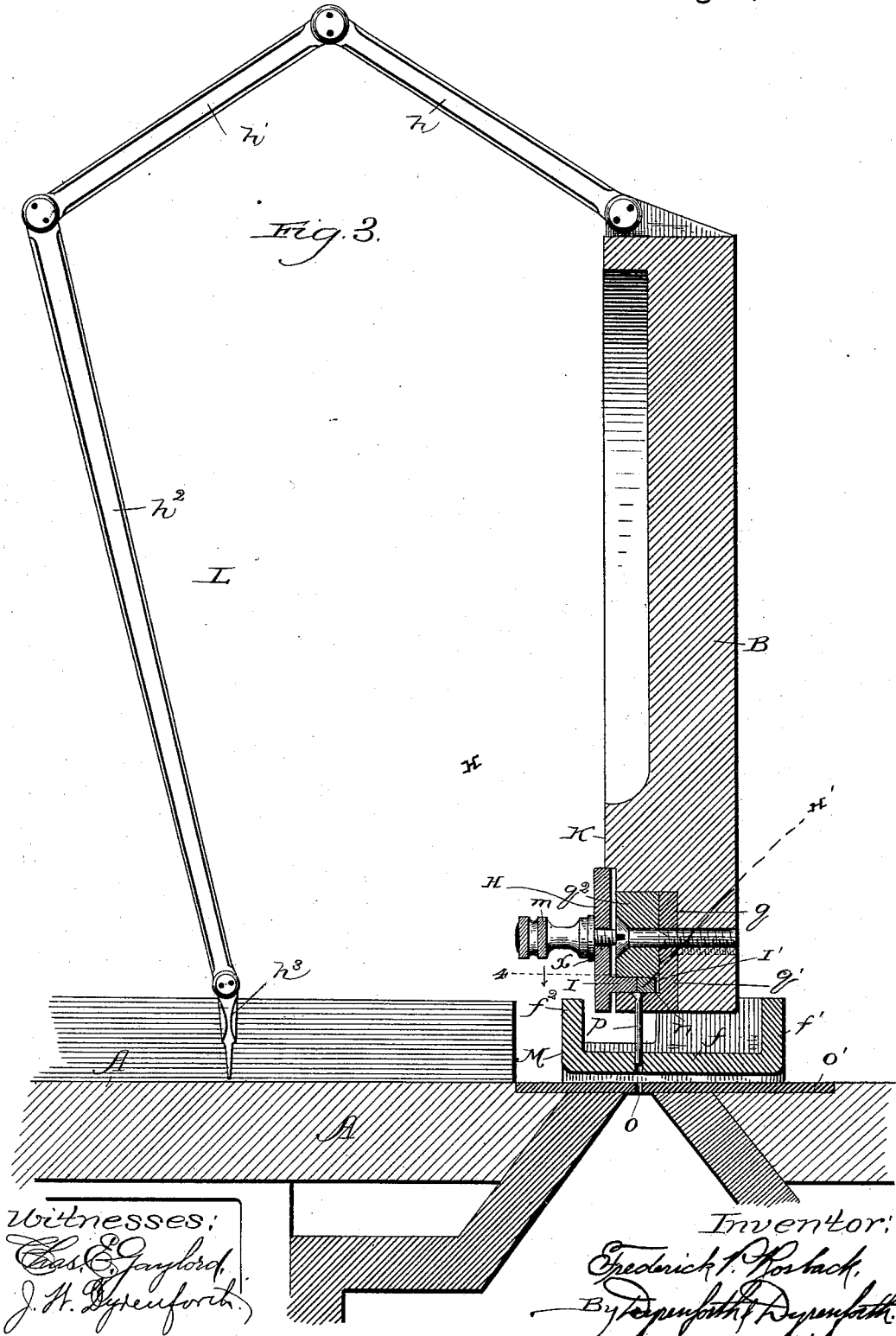

(No Model.) 4 Sheets—Sheet 3.
F. P. ROSBACK.
PERFORATING MACHINE.
No. 387,543. Patented Aug. 7, 1888.
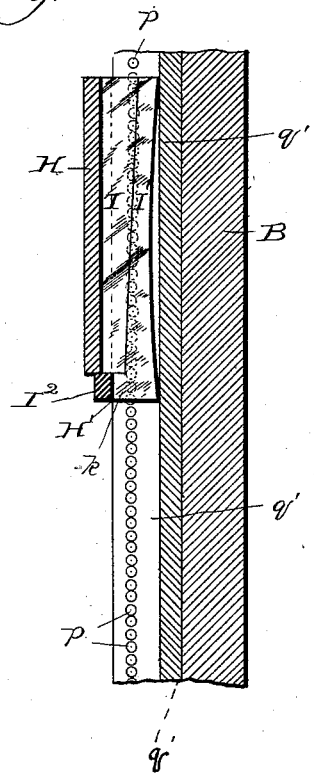
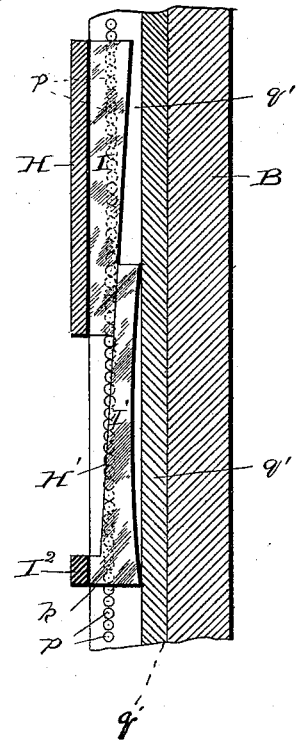
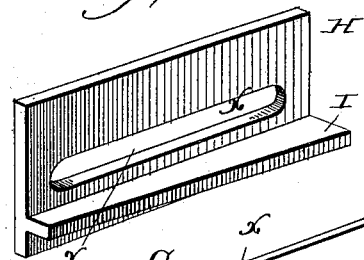
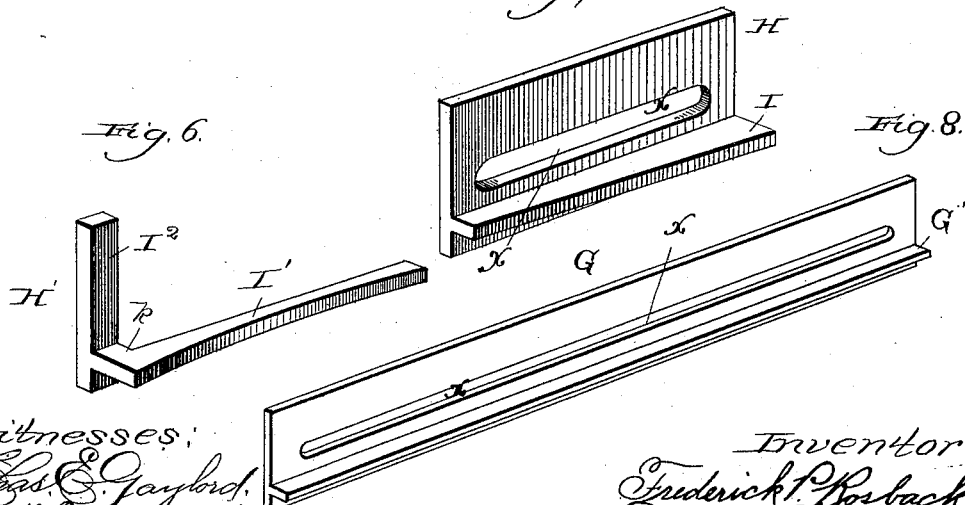
Witnesses:
Chas. E. Gaylord
J. H. Dyrenforth
Inventor:
Frederick P. Rosback
By Dyrenforth & Dyrenforth
Attys.

(No Model.) 4 Sheets—Sheet 4.
F. P. ROSBACK.
PERFORATING MACHINE.
No. 387,543. Patented Aug. 7, 1888.
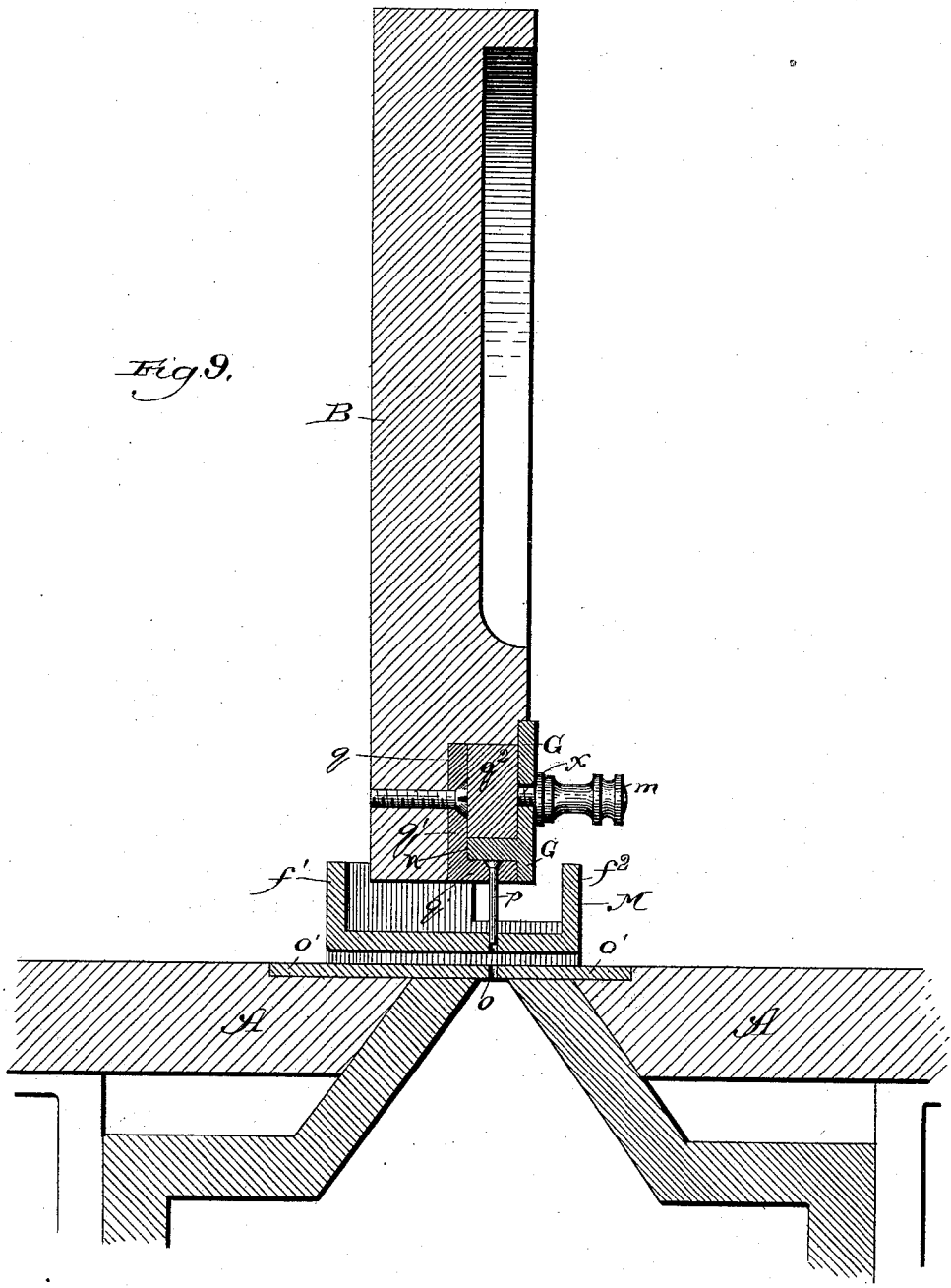
Witnesses:
Chas. E. Gaylord.
Chas. E. Gorton.
Inventor:
Frederick P. Rosback,
By Dyrenforth & Dyrenforth,
Attys

UNITED STATES PATENT OFFICE.

FREDRICK P. ROSBACK, OF CHICAGO, ILLINOIS.

PERFORATING-MACHINE.

SPECIFICATION forming part of Letters Patent No. 387,543, dated August 7, 1888.

Application filed June 16, 1887. Serial No. 241,535. (No model.)

*To all whom it may concern:*

Be it known that I, FREDRICK P. ROSBACK, a citizen of the United States, residing at Chicago, in the county of Cook and State of Illinois, have invented a certain new and useful Improvement in Perforating-Machines; and I hereby declare the following to be a full, clear, and exact description of the same.

My invention relates to an improvement in the class of machines for perforating checks, stubs, labels, sheets of postage-stamps, and other papers requiring the provision of divisional lines at which to render separation by tearing easy.

It is common in machines of the foregoing class to provide means for producing intermittent series of idle or inoperative members in the line of punches to adapt the machine, when the cross-head carrying the punch-bar descends, to force only such punches as are needed through the paper, while the others will be raised. This construction enables a sheet to be perforated in intermittent series of holes of any desired length or lengths.

My present invention has for its objects the provision of improved means for holding the punches or perforating needles in operative position for producing in the row of punches intermittent members or series of inoperative needles, of a gage on the cross-head above the punch-bar by means of which to control the adjustment of the mechanism for regulating the punches into operative and inoperative series or members, and of an index-finger to afford means for guiding the operator in feeding the paper to be perforated.

In the drawings, Figure 1 is a broken sectional front elevation of a foot-perforator provided with my improvements, and is drawn to a smaller scale than the other figures; Fig. 2, a broken portion of the device, showing a detail and viewed in the direction of the arrow on the line 2 of Fig. 1; Fig. 3, a section taken on the line 3 of Fig. 1 and viewed in the direction of the arrow; Fig. 4, a fragmentary section taken on the line 4 of Fig. 3, viewed in the direction of the arrow, and showing the longitudinally-adjustable punch-retaining wedges together; Fig. 5, a similar view showing the punch-retaining wedges drawn asunder; Figs. 6, 7, and 8, perspective views of details and features of my improvements, and Fig. 9 a section taken on the line 9 of Fig. 1 and viewed in the direction of the arrow.

A is the table of a foot-perforator, supported on legs suitably braced, as shown, and surmounted by a cross-head, B, supported near its extremities at opposite sides of the table by vertical rods $r$, pivotally connected at their lower ends eccentrically, as shown in Fig. 2, to the opposite ends of a rock-shaft, C, supported in bearings in the frame of the machine and carrying near its center a presser-foot, D, connected by a stiff helical spring, E, with a stationary cross-head, E'. Pressure on the foot D turns the rock-shaft against the resistance of the spring E to pull down the cross-head B, which is returned to its normal position by the resilience of the spring when the pressure is released.

The parts thus described are all old in foot-perforators, and hence the general nature of the foregoing description of them. My improvements are not, however, confined in their application to foot-perforators, their representation in such connection being merely by choice, since they are equally applicable to perforators operated by hand or power.

The cross-head B is provided along its lower edge with a rectangular recess, $q$, Fig. 3, containing an angle-plate, $q'$, secured to its back to cause the horizontal portion of the plate $q'$ to form the base or lower side of the recess, which base is also perforated longitudinally to receive punches $p$, suspended in the perforations at their heads and extending through perforations in vertical line with them in the stripper M, and when operated through openings $o$, provided in proper position below the stripper in the die $o'$, as shown. The angle-plate $q'$ thus constitutes the punch-bar. The recess $q$ contains a plate, $q^2$, fitting into it to leave a space, $n$, for a purpose hereinafter described, between its lower side and the horizontal perforated portion of the punch-bar $q'$, the plate $q^2$ being secured against the vertical portion of the punch-bar $q'$ by different bolts or screws from those serving to secure the punch-bar $q'$ to the back of the recess $q$ in the cross-head. This construction, by permitting the plate $q^2$ to be easily removed without disturbing the punch-bar $q'$, allows ready access to the punches for repairs.

G, Fig. 8, is a plate slotted longitudinally, as shown at $x$, and provided on its inner face below the slot with a rectangular flange, G', to fit into the space $n$, formed by the plate $q^2$ in the recess $q$, into which space it is inserted to rest upon the heads of the punches throughout a line of the same coextensive with the length of the bearing-flange G', and the plate G is secured in place by means of set-screws $m$, passed through the slot $x$ into the plate $q^2$, provided with threaded perforations to receive them. The set-screws serve to tighten the plate G in place to cause the flange G' to afford a rigid stop to the rise of the punches underneath it, and by loosening them they permit the plate G and flange upon it to be moved by sliding longitudinally to any part of the space $n$ for the purpose of producing a bearing upon any desired portion of the line of punches or of releasing any desired portion of the same from the bearing-flange G'.

Any number of flanged plates G may be provided in lengths according to requirement, whereby they may be adjusted in the space $n$ to leave desired intermittent series of inoperative punches, which will produce corresponding intermittent unpunched spaces on the paper. I prefer, however, to provide, ordinarily, only one flanged plate, G, near one end of the line of punches, as shown, and to produce desired intermittent series of operative and inoperative punches with the assistance of the extensible bearing or retaining plates H and H', (illustrated in Figs. 6 and 7,) hereinafter described. It may be stated, though, that either construction of retaining-plate (shown in Fig. 8 or in Figs. 6 and 7) may be used alone, in desired numbers and lengths, in a perforating-machine, although the last-named construction has advantages which are lacking in the first; but I prefer to use them together, as stated.

The plate H, which has a longitudinal slot, $x$, like the plate G, and may, like the latter and the retaining-plate H', hereinafter described, be of any desired length, (the plates H and H' being coextensive, or substantially so, longitudinally,) is provided with a flange, I, below the slot, formed to produce on its inner surface an inclined plane, and the retaining-plate H' comprises a bearing bar or flange, I', having an inclined plane on its outer surface to correspond with that of the flange I and concaved on its opposite or inner surface, as shown, and extending from a plate, I², forming a guide and stop on one end, which is bent to form the right-angular portion $k$.

The retaining-plate H' is adjusted by inserting the flange I' into the space $n$ with the concave surface against the surface of the vertical portion of the punch-bar $q'$, when the plate H is adjusted by inserting its flange I into the same space, $n$, in a manner to cause the inclined planes when brought together to form a double wedge. Although the form of a double wedge is produced by this construction, its function is not to produce a wedging effect, but merely to allow the plates H and H' to be moved in the space $n$ toward and from each other without thereby removing any portion of the flanges I and I' from the line of the heads of the punches.

The plates H are secured, like the plate G, by means of set-screws $m$, which also, as the plates H are adjusted over the flanges I', secure the latter in place. Since the bearing-point or strain of the set-screw $m$ of each plate H is necessarily always between the extremity of its companion H', having the stop I², and the opposite extremity, if the rear side of the flange I' were flat the tightening of the set-screw would tend to force outward the end having the stop I² by tipping it, if the plates H and H' were drawn asunder sufficiently far to cause the end of the flange I to bear against the adjacent extremity of the flange I', and might thus remove portions of the bearing parts of the two devices from the line of the punches. This result will be understood by considering the case of a rod or bar resting lengthwise on a flat surface. If the rod be pressed down at one end, it is liable to rise at its opposite end. By slightly hollowing out the rear side of the flange I' any tendency by tightening the set-screw to force outward the end of the plate H', having the stop I², is counteracted.

As will be seen, the two plates H and H' may be extended longitudinally to produce a continuous bearing upon the line of punch-heads, equal or substantially equal to the combined lengths of the two, and by sliding them toward each other such bearing may be shortened to leave an uncovered section of any desired length in the line of punches between any two holding devices, H H', or H H' and G, or H H' and an extremity of the line of punches. When the plates H and H' are slid toward each other, the head or stop I² on the plate H' prevents them from passing each other.

Upon the forward side of the cross-head B, over the punch-bar portion thereof, is a graduated scale, K, Fig. 1, to guide the operator in adjusting the punch-holding devices described. I also provide an adjustable index-finger, L, Fig. 3, comprising jointed arms $h$, $h'$, $h^2$, and $h^3$, (four in number, though more or fewer may be employed,) capable of being bent and tightened at their joints, the first being pivoted to the cross-head near its center and the last pointed, as shown. This adjunct enables the operator to adjust ruled paper or other paper having indicating-marks upon it equidistant apart underneath the punches to insure the production of the perforating at the desired line. Thus if a sheet is to be perforated, for example, at every third line, the index-finger, by being adjusted to point to the third line from that previously used as a gage, will indicate to the operator how far to feed the sheet to bring the desired line under the punches. This index-finger avoids the necessity of providing the ordinary gage on the table A at the rear side of the needle-bar, by the use of which—inasmuch as in performing its gaging function it also operates as a stop to the sheet—it requires loosening after each perforating operation to permit the sheet to pass, and resetting and tightening for each succeeding perforating operation. By means of my index-finger gage I can perforate a sheet on the desired equidistant lines continuously in one operation—that is to say, without stopping to readjust a gage after each perforating operation. When the sheet is not cut square with relation to the lines upon it to be perforated, (as printed lines,) two or more index-fingers, L, may be required.

As strippers have hitherto been commonly constructed, they have comprised flat perforated plates $f$, supported at opposite ends and bent to a right angle at their rear edges to produce the vertical flanges $f'$. This construction, however, is attended with the disadvantage that the horizontal portion or plate $f$ becomes bent or concaved longitudinally between the supported ends and toward the forward edge by the action of the punches, which, in each operation of the perforator, pass through the perforations in the stripper. This effect is due to the friction incident to the required snug fit of the punches in the holes through the stripper and tends to destroy the necessary alignment between the punches and holes. I prevent the tendency to bend, as aforesaid, by turning up the forward edge of the plate $f$ to produce the strengthening-flange $f^2$, which so stiffens the plate $f$ as to prevent its being concaved or bent longitudinally by the punching operations of the punches.

I do not herein claim the double-flanged construction of stripper, as it is not new, being illustrated in Letters Patent No. 374,880, granted me on the 13th day of December, 1887.

What I claim as new, and desire to secure by Letters Patent, is—

1. In a perforating-machine, the combination, with the cross-head and punch-bar, of a sliding plate provided on its inner side with a flange confined over the line of punches, substantially as and for the purpose set forth.

2. In a perforating-machine, the combination, with the cross-head and punch-bar, of longitudinally-extensible sliding flanges confined over the line of punches, substantially as and for the purpose set forth.

3. In a perforating-machine, the combination, with the cross-head and punch-bar, of two sliding flanges confined over the line of punches and inclined on their adjacent surfaces in opposite directions to afford an extensible bearing for the punches, substantially as and for the purpose set forth.

4. In a perforating-machine, the combination, with the cross-head and punch-bar, of a longitudinally-extensible sliding bearing for the punches, comprising a plate, H, having a flange, I, and a flange, I', the said flanges being confined over the line of punches and having their adjacent surfaces inclined longitudinally in opposite directions, substantially as and for the purpose set forth.

5. In a perforating-machine, the combination, with the cross-head and punch-bar, of a longitudinally-extensible sliding bearing for the punches, comprising a plate, H, having a flange, I, and a flange, I', hollowed out longitudinally on its rear side, the said flanges being confined over the line of punches and having their adjacent surfaces inclined longitudinally in opposite directions, substantially as and for the purpose set forth.

6. In a perforating-machine, the combination, with the cross-head and punch-bar, of a longitudinally-extensible sliding bearing for the punches, comprising a plate, H, having a flange, I, and a flange, I', hollowed out longitudinally on its rear side and provided with a plate, I$^2$, near one extremity, the said flanges being confined over the line of punches and having their adjacent surfaces inclined longitudinally in opposite directions, substantially as and for the purpose set forth.

7. In a perforating-machine, the combination, with the cross-head and punch-bar, of a longitudinally-slotted sliding plate, G, provided on its inner side with a flange, G', a set-screw, $m$, for confining the plate G in place with its flange over the line of punches, and a longitudinally-extensible sliding bearing for the punches, comprising a slotted plate, H, having a flange, I, a flange, I', the said flanges being confined over the line of punches and having their adjacent surfaces inclined longitudinally in opposite directions, and a set-screw, $m$, for the said extensible bearing, substantially as and for the purpose set forth.

8. In a perforating-machine, the combination, with the cross-head and punch-bar, of a sliding plate provided on its inner side with a flange confined over the line of punches, and a graduated scale, K, on the front face of the cross-head above the punch-bar, substantially as and for the purpose set forth.

9. In a perforating-machine, the combination, with the table A and cross-head, of an index-finger, L, substantially as and for the purpose set forth.

10. In a perforating-machine, the combination, with the table A and cross-head, of an adjustable index-finger, L, substantially as and for the purpose set forth.

11. In a perforating-machine, the combination, with the table A and cross-head B, of an index-finger, L, formed in adjustable sections, substantially as and for the purpose set forth.

FREDRICK P. ROSBACK.

In presence of—
J. W. DYRENFORTH,
CHAS. E. GAYLORD.